(12) United States Patent
Wolf et al.

(10) Patent No.: US 11,519,458 B2
(45) Date of Patent: Dec. 6, 2022

(54) MODEL-BASED METHOD AND SYSTEM FOR MONITORING THE CONDITION OF A SLIDING BEARING, PARTICULARLY FOR WIND TURBINES

(71) Applicants: ZF Friedrichshafen AG, Friedrichshafen (DE); ZF Wind Power Antwerpen N.V., Lommel (BE)

(72) Inventors: Daniel Wolf, Friedrichshafen (DE); Umit Kutluay, Friedrichshafen (DE); Luk Geens, Lint (BE); Johannes Schaefer, Friedrichshafen (DE); Georg Tenckhoff, Friedrichshafen (DE)

(73) Assignees: ZF FRIEDRICHSHAFEN AG, Friedrichshafen (DE); ZF WIND POWER ANTWERPEN N.V., Lommel (BE)

( * ) Notice: Subject to any disclaimer, the term of this patent is extended or adjusted under 35 U.S.C. 154(b) by 241 days.

(21) Appl. No.: 16/954,209

(22) PCT Filed: Nov. 22, 2018

(86) PCT No.: PCT/EP2018/082292
§ 371 (c)(1),
(2) Date: Jun. 22, 2020

(87) PCT Pub. No.: WO2019/120871
PCT Pub. Date: Jun. 27, 2019

(65) Prior Publication Data
US 2021/0372466 A1 Dec. 2, 2021

(30) Foreign Application Priority Data
Dec. 20, 2017 (DE) ...................... 10 2017 223 418.0

(51) Int. Cl.
*F03D 17/00* (2016.01)
*F03D 80/70* (2016.01)
(Continued)

(52) U.S. Cl.
CPC ............ *F16C 17/246* (2013.01); *F03D 17/00* (2016.05); *F03D 80/70* (2016.05); *G01M 13/04* (2013.01);
(Continued)

(58) Field of Classification Search
None
See application file for complete search history.

(56) References Cited

U.S. PATENT DOCUMENTS

| 4,406,169 A | 9/1983 | Ikeuchi et al. |
| 5,447,375 A * | 9/1995 | Ochiai .................. F16C 32/064 384/100 |

(Continued)

FOREIGN PATENT DOCUMENTS

| AT | 7889 U2 | 10/2005 |
| DE | 3117060 A1 | 2/1982 |

(Continued)

OTHER PUBLICATIONS

Hopf and Schuler, Investigations on Large Turbine Bearings Working Under Transitional Conditions Between Laminar and Turbulent Flow, Journal of Tribology 628/vol. 111, Oct. 1989 (Year: 1986).*

*Primary Examiner* — Matthew G Marini
(74) *Attorney, Agent, or Firm* — Leydig, Voit & Mayer, Ltd.

(57) ABSTRACT

A method for monitoring a condition of a sliding bearing operated with lubricating oil for a rotating component includes calculating, by a control unit as an output variable of a sliding bearing model, a calculated value of a minimum gap thickness of the sliding bearing. The calculated value is (Continued)

calculated by orbit analysis from at least one physical sliding bearing model to which at least a rotational speed of the rotating component, a bearing load, and a temperature of the sliding bearing are supplied as input variables. The method further includes measuring, with at least one sensor, a minimum gap thickness to provide a measured value of the minimum gap thickness, and comparing the measured value of the minimum gap thickness with the calculated value of the minimum gap thickness for the purpose of adjustment.

14 Claims, 1 Drawing Sheet

(51) Int. Cl.
*G05B 23/02* (2006.01)
*F16C 17/24* (2006.01)
*G01M 13/04* (2019.01)
*G08B 21/18* (2006.01)

(52) U.S. Cl.
CPC ....... *G05B 23/0254* (2013.01); *G08B 21/182* (2013.01); *F05B 2240/50* (2013.01); *F05B 2260/84* (2013.01); *F16C 2233/00* (2013.01)

(56) References Cited

U.S. PATENT DOCUMENTS

| | | |
|---|---|---|
| 10,444,118 B2 | 10/2019 | May et al. |
| 2006/0288764 A1 | 12/2006 | Langthaler et al. |
| 2011/0188988 A1 | 8/2011 | Wadehn |
| 2012/0068460 A1 | 3/2012 | Wadehn et al. |
| 2017/0122838 A1* | 5/2017 | Ko .............. G01M 13/04 |
| 2017/0350789 A1* | 12/2017 | Poon .............. F03D 80/50 |

FOREIGN PATENT DOCUMENTS

| | | |
|---|---|---|
| EP | 2048562 A1 | 4/2009 |
| WO | WO 2011023209 A1 | 3/2011 |
| WO | WO 2014174097 A1 | 10/2014 |
| WO | WO 2017105839 A1 | 6/2017 |

* cited by examiner

MODEL-BASED METHOD AND SYSTEM FOR MONITORING THE CONDITION OF A SLIDING BEARING, PARTICULARLY FOR WIND TURBINES

CROSS REFERENCE TO RELATED APPLICATIONS

This application is a U.S. National Stage Application under 35 U.S.C. § 371 of International Application No. PCT/EP2018/082292 filed on Nov. 22, 2018, and claims benefit to German Patent Application No. DE 10 2017 223 418.0 filed on Dec. 20, 2017. The International Application was published in German on Jun. 27, 2019 as WO 2019/120871 Al under PCT Article 21(2).

FIELD

The present disclosure relates to a method for monitoring the condition of a sliding bearing operated with lubricating oil for a rotating component, in which a physical variable characteristic for the bearing is measured with at least one sensor, which variable is supplied to a control unit for condition monitoring. Furthermore, the present disclosure also relates to a system for monitoring the condition of a sliding bearing operated with lubricating oil by the use of such a method and additionally relates to a machine or plant, preferably a wind turbine, equipped with such a system. In addition, the present disclosure further relates to a computer program product embodying such a method.

BACKGROUND

US 2011/0188988 A1 describes a technical solution for a sliding bearing of a rotor on a hub of a wind turbine, which is designed here as an axial bearing arrangement. The axial bearing arrangement acts on opposing ring surfaces of a rib arranged on the proximal end of a rotor blade. Here, the condition of the lubricating oil in the bearing gap is determined in accordance with a first described embodiment via a pressure sensor, which measures the bearing gap pressure arranged on the side of the bearing shell or the shaft, using which a control unit influences the pump control of the pressure lubrication circuit and/or the operation of the wind turbine, for example its dynamic condition. According to another embodiment described here, this control system is based on a sensor-based determination of the temperature of the lubricating oil in the bearing gap of the sliding bearing. The temperature prevailing there is an indicator of the load on the rotor blade. Finally, according to an additional embodiment, it is proposed that the lubricating film thickness in the bearing gap of the sliding bearing—which corresponds to the current thickness of the bearing gap at the narrowest point—is determined by sensor technology, on the basis of which the aforementioned control can also be carried out. An overload of the rotor blade can be deduced if the lubricating film thickness falls below a predefined minimum value.

US 2012/0068460 A1 discloses a radial sliding bearing arrangement for a drive shaft of a drive train of a wind turbine, which drive shaft rotates faster in normal operation than the aforementioned solution from the prior art. A sliding bearing forms the bearing point of the drive shaft on the rotor hub side. The sliding bearing arrangement also comprises a sensor which measures the gap width and thus also the thickness of the lubricating film of the lubricating oil in the bearing gap at a suitable point in order to, on the basis of the measured value, control the pump of a pressure lubrication circuit and a lift actuator of the sliding bearing arrangement, with the assistance of which the shaft can be mounted in various hydrodynamic operating modes.

Furthermore, the generally known prior art, in particular for wind power gearboxes with at least one planetary stage on the gearbox input side, also results in sliding bearings of rotating components, for example a sun shaft on the output side opposite the gearbox housing or the planet wheels on the planet carrier bolt as a stationary shaft. Such sliding bearing arrangements are usually connected to a pressure lubrication circuit internal to the gearbox for the permanent supply of lubricating oil, which circuit may be equipped with sensors for monitoring the condition of the pressure lubrication.

SUMMARY

In an embodiment, the present invention provides a method for monitoring a condition of a sliding bearing operated with lubricating oil for a rotating component. The method includes calculating, by a control unit as an output variable of a sliding bearing model, a calculated value of a minimum gap thickness of the sliding bearing. The calculated value is calculated by orbit analysis from at least one physical sliding bearing model to which at least a rotational speed of the rotating component, a bearing load, and a temperature of the sliding bearing are supplied as input variables. The method further includes measuring, with at least one sensor, a minimum gap thickness to provide a measured value of the minimum gap thickness, and comparing the measured value of the minimum gap thickness with the calculated value of the minimum gap thickness for the purpose of adjustment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The field of application of the present disclosure extends to hydrostatic or hydrodynamic sliding bearings for heavy shafts as rotating components, which are used primarily in the fields of automotive engineering, shipbuilding technology and mechanical and plant engineering. Within the framework of such applications, heavy shafts are understood to be in particular drive shafts with a shaft diameter between 30 and 300 mm. However, smaller or larger shaft diameters are also conceivable, if they can be equipped with a rotary bearing arrangement of the type used here, in particular if a lubricating oil supply to the bearing gap is accessible. The shafts of the type of interest here are found, for example, in wind turbines for the mounting of gearbox components, such as gears, gear pairs and shafts interacting with them. Applications are also conceivable which relate to a bearing arrangement of other rotating components, such as a rotor shaft of the drive train between the rotor and the gearbox input, or also a bearing arrangement of a rotor blade on a hub, where the pitch of the rotor blade is adjustable. In principle, solutions in accordance with the present disclosure can be applied to axial and radial sliding bearing arrangements and combinations thereof. In addition to a rotating shaft as a rotating component, it is also possible for said component to be designed as a component rotating around a stationary shaft in the sense of a kinematic reversal.

If sliding bearings are operated hydrodynamically, they are theoretically wear-free. Changing operating conditions of the machine or plant comprising a sliding bearing along with faults in the pressure lubrication can lead to an interruption of the functioning of the sliding bearing and can cause wear, damage or even failure of the bearing point. The lubricating gap in the sliding bearing, mainly the critical minimum gap thickness, is usually a few microns and provides information regarding the operating condition of the sliding bearing. Typical operating conditions of the sliding bearing are considered to be the condition of mixed friction, in which, for example, a shaft has not yet completely lifted off the associated bearing shell with increasing rotational speed, or, with further increasing rotational speed, the hydrodynamic condition following this in which a load-bearing lubricating oil film exists in the range of the nominal rotational speed.

Using other easy-to-measure physical variables characteristic for the bearing, such as the lubricating oil temperature, the load on the sliding bearing can be calculated and conclusions can be drawn regarding the torque in the drive train. However, measuring the gap thickness in the sliding bearing is problematic because a contact or distance sensor usually used for this purpose must not be touched even after material removal from bearing surfaces due to wear and tear, and the positioning of the sensor in a recess impairs the bearing geometry and hydrodynamics such that the bearing load capacity would decrease. In addition, distance sensors for measuring the eccentricity of a sliding bearing in particular are quite sensitive due to the required resolution and have a small measuring range, so that a close arrangement to the measuring point is required, which in turn conflicts with the prevailing requirements for the robustness of the sliding bearing arrangement.

A method and system are disclosed herein for the monitoring of the condition of a sliding bearing operated with lubricating oil in such a way that, without impairing bearing functionality, a development towards undesired operating conditions is recognizable and further analyses and statements regarding the condition of the sliding bearing, in particular its wear condition, are possible.

A method is disclosed herein for the monitoring of the condition of a sliding bearing, a system is disclosed herein for carrying out this method, which system can preferably be used in connection with a wind turbine. A computer program product embodying the method is further disclosed herein.

The present disclosure includes the teaching in process engineering that a control unit for condition monitoring determines, from at least one physical sliding bearing model N-V-F (N=nominal or normal condition, V=variable model that can be updated according to reality, F=fault model) which receives as input variables u at least the rotational speed n and the torque M and assigns to such input variables u a dynamic behavior of the sliding bearing or lubricating gap, at least one condition variable s; T; p of the sliding bearing and/or the lubricating oil as output variable y. Here, time derivative x-dot, the change in the condition variables over time and solely a "mathematical trick" of the condition space method, is an internal calculation variable that is not used externally. At least one sensor is used to measure a comparison value for at least one of the specified condition variables s; T; p preferably the gap thickness of the lubricating gap of the sliding bearing, the bearing temperature and/or the lubricating oil pressure. Finally, from a comparison of the measured value of the condition variable s; T; p with the value of the condition variable s; T; p calculated by the model as output variables y, the control unit evaluates the extent to which the physical sliding bearing model N-V-F maps the real behavior of the sliding bearing.

The method disclosed herein provides, in particular, for the parallel calculation of different individual models contained in the sliding bearing model N-V-F. An ideal model N thereby represents the nominal case in the sense of the normal operation of a sliding bearing that is in cycle, which represents a modeling of the structural condition of the sliding bearing. Manufacturing tolerances and parameters of the sliding bearing components can thereby also be taken into account. A variable model V is primarily used for calibration by comparison with a measured sensor value of a condition variable of the sliding bearing. Thus, the variable model V can be adapted to the real behavior. In addition, at least one fault model F can be used for mapping with regard to characteristic fault conditions—for example, a changed oil viscosity, insufficient lubrication, expansion of the bearing geometry due to wear and the like—within the scope of condition monitoring.

Within the framework of this arrangement, models are understood to be physical models of an individual sliding bearing or of the entire system. All models are thereby modeled in the same way; i.e., they are based on the same equations. These can be non-linear systems of equations for the hydrodynamic behavior (for example, a Reynolds equation), temperature models, linear-elastic (FE), elastokinematic and structural dynamic behavior, which are coupled in a manner corresponding to the bearing or the entire drive train. The models can be linearized in the operating range to be monitored and represented in the condition space according to the following formula:

$$\dot{x}(t)=A(\rho)x(t)+B(\rho)\,u(t)\,y(t)=C(\rho)x(t)+D(\rho)u(t)$$
$$\rho=(\rho_1\rho_2,\ldots,\rho_i)^T$$

where the variables or formula symbols have the following meaning: x=condition vector, y=output variables, u=input variables, A=condition matrix, B=input matrix, C=output matrix, D=through matrix, ρ(rho)=variable parameters, operating parameters or disturbance variables (whose value is unknown, but whose influence is known)

It should also be noted that the models can also be designed as a single-input, single-output (SISO) or multiple-input, multiple-output (MIMO) system. As input variables u, easily measurable variables, such as oil temperature in sump T, rotational speed n, torque M, are usually provided. The condition variables x are variables that reflect the operating condition of the sliding bearing; these are, for example, lubrication gap height or bearing positions, lubrication oil pressure, oil volume flow, bearing temperature or the temperature of the escaping oil, and others if necessary. The bearing position(s) can be determined from contact or distance sensors for measuring the gap thickness of the sliding bearing. Output variables y can also be other parameters that are not measured of the sliding bearing or the system along with measured condition variables and may deviate from them in terms of quality and sampling time. This is particularly intended for the determination of the minimum gap height (h_min) of the sliding bearing and the temperature of the escaping oil, which is continuously calculated in the model but can usually be determined by sensor technology only in certain areas or in rough terms. Known variables, for example outside temperature, wind strength, angle of attack of the rotor blades, etc., or unknown disturbance variables p (rho) can be permissible—for example a load—or undesirable—for example wear—and can parameterize the ideal model N as the basic model for the initial condition or one of the fault models F. In this connection, the variable model V can be updated according to the real behavior by means of an observer model/Kalman filter.

According to an aspect of the disclosure, the output variables y of the physical sliding bearing model N-V-F are compared with the real measured condition variables for the purpose of adjustment/calibration, in particular of the minimum gap height of the bearing gap s and thus the lubricating film height, the bearing temperature T, the lubricating oil pressure p or further measured variables or a vector of different output variables y.

If, in reality, the sliding bearing is started, the rotating component, for example the shaft, lifts off from the stationary component, for example the bearing shell, at a certain point in time. Such lift-off time can also be determined by sensor technology by, for example, a contact sensor for the purpose of calibration. At the point in time of lift-off, the lubricating film thickness is assumed to be the height of the maximum roughness peaks of both corresponding running surfaces of the sliding bearing. This value is compared with the value from the ideal model N; the difference is called the residual. Furthermore, the residuals of the at least one fault model F are calculated for the same value. If values that have not been measured are to be compared, the values of the variable model V, which have been adjusted to the real behavior of the sliding bearing, are used for comparison. Such an unmeasured value can be, for example, the lubricating film thickness after the lift-off point, if only a contact sensor is installed in the sliding bearing. In general, the residual for measured variable systems can be described with the following formula:

$$\int_{t_0}^{t_0+T_\psi} \Theta_N(\tau) d\tau$$

where the formula symbol $\Theta$ is a mathematical function that processes the difference in output and/or condition variables between model and reality (index N: nominal model compared to reality, F: fault model compared to reality) or different models. Since the differences are dependent on time, $\Theta$ is also dependent on the time $\xi$. If the $\Theta$ of the function corresponds to "1", then $\Theta$ corresponds to the differences. In the case of several variables (vector), the differences can be reduced to one variable as an amount, a scalar product or a mathematical function. Any transfer function (filter function) can be applied to the time-dependent difference (in the case of a vector, element by element). Integration from an arbitrary start time $t\_0$ up to a time $t\_0+T_\psi$ over the time-dependent function of the difference $\Theta(\xi)$ corresponds (depending on the function $\Theta$) to a functional effective or mean value over the time interval $T_\psi$ over which the residual is to be formed.

In the case of the lift-off time, the following quotients for the residual of the ideal model N in relation to the residual of the variable model V result from discrete consideration:

$$\Psi_i = \frac{\overbrace{\int_{t_0}^{t_0+T_\psi} \Theta_N(\xi) d\xi}^{\text{residual from filter for nominal case}}}{\underbrace{\int_{t_0}^{t_0+T_\psi} \Theta_V(\xi) d\xi + \in}_{\text{residual from filter for variable model adjusted to reality}}}$$

For the residual of the ideal model N in relation to the residual of the fault model F, the following relationship results:

$$\Psi_i = \frac{\overbrace{\int_{t_0}^{t_0+T_\psi} \Theta_N(\xi) d\xi}^{\text{residual from filter for nominal case}}}{\underbrace{\int_{t_0}^{t_0+T_\psi} \Theta_F(\xi) d\xi + \in}_{\text{residual from filter for fault case}}}$$

where the formula symbols which have not yet been discussed above of the two formulas mentioned above are designated as follows. $\psi$ designates the ratio of the residuals and can be referred to as the test criterion, the index i designates which residuals were put into the ratio (for example, nominal vs. fault case); i.e., which criterion was tested. The e in the denominator is an infinitesimally small value to avoid division by zero.

The above quotient of the residual of the ideal model N and the residual of the variable model V serves as a general fault indicator for faults that are not modeled, and for monitoring the algorithm. Since all models N, V, F are constructed in the same way, the quotient of the above formulas cancels out similar deviations. The variable model V of the model compared to the real behavior of the system shows a relatively small deviation due to updating, for example with a Kalman filter. In the ideal case, i.e. with a faultless sliding bearing, this also applies to the ideal model N. The quotient between the ideal model N and the variable model V oscillates around 1, since the numerator and denominator contain values of similar dimensions. If the residual fluctuates too greatly, the comparison is continued when the values are stable. Unstable time intervals are discarded. If the value is not stable for a longer period of time and if the specified quotient is outside of predefined limits, an error message is stored in the error memory; optionally, a fault message is issued in this respect to indicate that no clear condition diagnosis is possible.

In contrast, the quotient from the ideal model N and the fault model F is used to assign a deviation to a fault mode. If the quotient is less than 1 or below a specified limit value, for example 1.1 to 1.5, there is no fault. This allows the detection sensitivity for a fault to be adjusted.

In accordance with a further measure improving solutions according to the present disclosure, it is proposed that a wear model VS also be applied in addition, the output values yv of which represent a measure of the wear condition of the sliding bearing, wherein the operating behavior of the machine or plant comprising the sliding bearing can be adapted by the control unit according to the wear condition. Such an adjustment can be made, for example, as a function of at least one upper and/or lower predefined limit value. If such a limit value is reached or exceeded, for example, a load reduction, an adjustment of the oil pressure of the lubricating oil supply or the like can be carried out. In addition to an upper and/or lower limit value, several cascaded limit values or intermediate threshold values for a temperature range, pressure range or the like may trigger such or a similar adaptation of the operating behavior. The aforementioned wear model VS can, for example, provide information about the development of the surface roughness of the bearing surfaces. Wear models VS are preferably integrated in the sliding bearing model N-V-F discussed above or are designed independently of it.

According to a further measure, it is proposed that the operating behavior of the machine or plant be adjusted by the control unit if the at least one wear model VS shows excessive wear or if it shows a deviation from the quotients formed according to the two preceding formulas. As an adaptation to a high wear condition of the sliding bearing, which is preferably determined via characteristic predefined limit values or threshold values, the bearing load F acting thereon can be reduced and/or the rotational speed n can be increased in order to achieve a smoothing of the bearing running surfaces. In addition, start-up, shut-down and other recurring operating conditions are adjusted to ensure that the models show a negligible degree of damage.

The control system of a wind turbine in particular only reacts to a few critical parameters, for example the bearing temperature on the rapidly rotating shaft.

However, when changing over to sliding bearings, other bearings—for example, due to insufficient lubrication—can also reach the upper temperature limit. Therefore, it is proposed to convert, preferably into the control unit that is responsible for online monitoring of the machine or plant, such critical operating conditions which are preferably recognizable by monitoring characteristic predefined limit values or threshold values into one parameter, such as for example the bearing temperature, to which the control of the machine or plant already reacts with emergency shutdown. In this manner, other physical variables or dimensionless fault indicators can be advantageously used to calculate a value for the bearing temperature that causes the desired reaction of the machine or plant, for example an emergency shutdown.

In accordance with a further measure, it is proposed that at least the input variables x, rotational speed n and torque M be determined by a measurement in the power flow before or after the sliding bearing or across the bearing (measuring points for determining the torque are located before and behind the bearing) by means of a so-called dynamic load monitoring (DLM), which is known per se. This is because such variables are normally known in the plant control system, in particular for a gearbox equipped with at least one sliding bearing. The measurement can be performed before, after or in a gearbox, preferably by DLM or other known principles of the prior art. With DLM, a load detection is carried out during the operation by means of a differential measurement of load torques at the gearbox input and output.

Furthermore, it is also possible to calculate the gap thickness s of the sliding bearing, in particular the minimum gap thickness $s_{min}$, by means of orbit analysis using the determined temperature T of the sliding bearing, the rotational speed n of the rotating component and the bearing load F. In an orbit analysis, the spatial orientation of the rotating component, for example a shaft, relative to the stationary component, for example a bearing shell, of the sliding bearing is determined. This can be done in a known manner by empirical formula, EHD, Reynolds DGL and the like. Starting from a minimum gap thickness $s_{min}$, which is greater than the roughness peaks of the corresponding running surfaces, it can be assumed that the surfaces are separated. This lift-off time is additionally determined by measurement by a contact sensor. If the ohmic or capacitive resistance between the bearing shell and the shaft is used as the contact sensor, this changes significantly as soon as there are no more contact points. This allows a comparison of the results of the orbit analysis with reality for the minimum gap thickness $s_{min}$. The minimum gap thickness $s_{min}$ of the sliding bearing corresponds to the minimum lubricating film thickness which must be maintained during the operation of the sliding bearing. If the minimum lubricating film thickness is not reached, progressive bearing wear due to material removal must be expected.

A system for monitoring the condition of a sliding bearing operated with lubricating oil which carries out the method discussed above thus comprises at least one sensor for measuring a suitable condition variable s; T; p or the like of the sliding bearing, and an electronic control unit for the model-based monitoring of the condition of the sliding bearing, containing a physical sliding bearing model N-V-F, in which a parallel calculation of the different models contained therein takes place.

In accordance with a temperature-based embodiment, it is proposed that the sliding bearing model N-V-F calculates from input variables u: n, M, T_Sumpf, condition variable x: minimum lubrication gap height h_min (or $s_{min}$) and at least the output variable y: oil outlet temperature $T_A^*$ at the sliding bearing, and uses them in order to compare them with an oil outlet temperature $T_A$ measured by sensor technology for the plausibility checking of the sliding bearing model N-V-F. The variables u, x, y are model variables. The output variables y are used for comparison with measured values, wherein this vector can also contain condition variables x. This temperature-based embodiment is based on the idea that, for each sliding bearing, at least one temperature signal, for example of the outflowing lubricating oil to the side of the lubricating gap near the load zone or below the sliding bearing surface in the load zone of the bearing surface in the load zone, is available in any case which differs significantly from the oil sump temperature $T_S$. This temperature signal can be used for plausibility checks and as a condition feedback in the sense of a control for the temperature-based sliding bearing model N-V-F. Particularly for the variable model, this is intended to bring it into line with reality. From the operating conditions n, M and the oil sump temperature Ts, which corresponds to the oil inlet temperature into the sliding bearing, the condition variables for the sliding bearing are determined, for example its bearing gap s, bearing eccentricity, acting bearing loads, coefficient of friction, power loss and also the oil outlet temperature $T_A^*$.

With an alternative embodiment based on bearing gap, it is provided that the sliding bearing model N-V-F calculates at least one condition variable, at least comprising the bearing gap s in the sliding bearing, as the output variable y from at least the torque M and the rotational speed n as input variables u, and uses it in order to compare it with a bearing gap s measured by sensor technology for the plausibility checking of the sliding bearing model N-V-F, as already discussed above. This can also be used as condition feedback in the sense of a control for the sliding bearing model N-V-F based on the bearing gap. Particularly for the variable model, this is intended to bring it into line with reality.

In addition, when combining the embodiment based on a bearing gap and the embodiment based on temperature, the bearing load (the acting torque) can be back-calculated (reverse calculation from the sliding bearing model) and compared with the measured torque/acting bearing load. The difference can be used as an indicator for the function of the monitoring (in the sense of self-diagnosis) and the difference as control feedback (to adapt the models to reality).

From the model-based monitoring of the condition of the sliding bearing, it is possible to derive condition characteristics such as wear, insufficient lubrication, lubrication oil damage and the like, along with recommendations for improving the operational management or control of the machine or plant in the form of a start-up phase, emergency shutdown and the like. Preferably, in the course of the adjustment, the wear model VS is supplied with characteristic values for the tribological regime of the sliding bearing, wherein the wear model VS includes at least one of the following functions:

Wear characteristics map: For each operating condition, for example sliding speed and bearing gap, the corresponding wear rate is stored as a parameter of the material removal per time which was obtained from tests.

Physical wear models: Physical wear models according to Archard or Fleischer are considered from the general prior art, including the necessary models for the description of the surface structure along with consideration of the same in the sliding bearing model N-V-F.

Probabilistic wear models: These represent trained neural networks based on tests.

A tribological regime of the sliding bearing is understood to be the typical operating conditions in which a sliding bearing can be found (analogous to the x-axis of the Stribeck curve) and the "main causes" (operating parameters). The conditions are boundary friction or solid-state friction, mixed friction and hydrodynamic friction. The respective ranges can be further subdivided as desired, for example mixed friction with 100, 90, . . . 10% solid contact pressure (asperity contact). Now the bearing can arrive into the same operating condition by different circumstances; for example, mixed friction with 50% asperity contact is possible at high load, low speed and low oil temperature and also at medium load, medium speed and high oil temperature. The operating condition (x-axis) and operating parameters form a multi-dimensional matrix; each field of the matrix reflects a tribological regime (condition +cause). Residence times or revolutions are now classified in this matrix. The wear characteristic map is also based on the structure of this classification matrix, i.e. for each regime the wear rate was calculated or determined in a test. In this manner, different wear processes can be accumulated online or offline (for example, when reading out the statistics memory or a diagnostic function).

The wear rate determined from the wear model VS is accumulated in an accumulation unit Akk according to a further measure, taking into account at least one of the following functions:

Continuous or discrete accumulation of the location-dependent wear of the sliding bearing, wherein the load vector is already known from the sliding bearing model, for example per angular segment.

Carrying along an up-to-date model of the geometry of the sliding bearing from the determined wear, which is taken into account in the sliding bearing model N-V-F for the calculation of the characteristics of the sliding bearing.

According to another measure, it is proposed that an output unit AE is provided for interpreting the results from the sliding bearing model N-V-F, the accumulation unit Akk and/or the wear model VS. Within the scope of condition monitoring, the output unit AE executes at least one of the following functions:

Warning if the wear in a bearing area, for example an angular segment, exceeds previously defined limits.

Derivation of recommendations for action for the operational control of the machine or plant, for example in the form of a display of positioning commands or intervention in operation by reducing power, shifting the operating point and the like.

Diagnostic function for the system, for example, for the degree of reliability of the adjustment.

Provision of statistical information regarding the operating behavior of the machine or plant.

Creation of a history of the wear progress over time with a trend analysis and a forecast of maintenance requirements, since the sequence of operating conditions has an influence on the surface structure. Thus, nominal operation can lead to smoothing of the surface, while boundary friction can lead to an increase of roughness. In this manner, it can be shown which operating behavior will lead to an improvement or further deterioration in the future. If the surface structure has already deteriorated marginally, only improving operating conditions—for example, power reduction—can be permitted. This is because it is first necessary to smooth the surfaces before operating conditions that cause further deterioration are permitted.

The sliding bearing model N-V-F, the wear model VS along with the adjustment, accumulation and output functions are preferably initially pre-parameterized for each sliding bearing, but can be changed or extended at any time by updating the computer program product, which preferably embodies such functions. The change can also take place independently in the form of model identification, self-calibration, training of neural networks, etc. Instead of continuous or discrete processing of the signals, it is possible in particular to provide for the classification of the data and a type of batch processing for longer periods of time.

Figure 1:
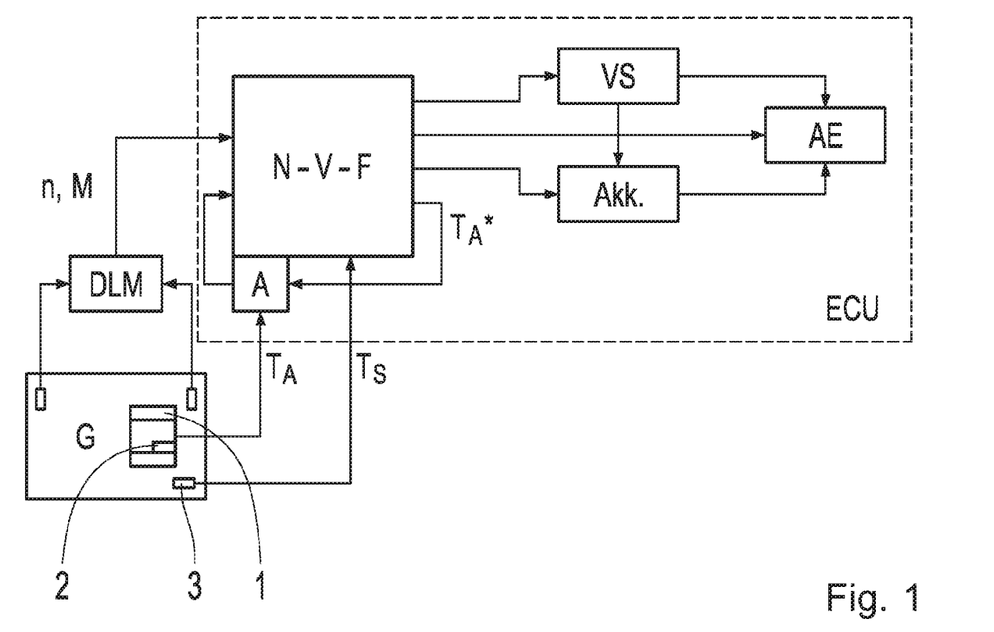
FIG. 1 a schematic block diagram of a system for the model-based monitoring of the condition of a sliding bearing contained in a gearbox, and FIG. 2 a basic flow chart of the method carried out by the sliding bearing model of the system according to FIG. 1.

According to FIG. 1, a system for the monitoring of the condition of a sliding bearing 1 operated with lubricating oil comprises a sensor 2 for measuring the temperature $T_A$ at the oil outlet point of the sliding bearing 1. In this exemplary embodiment, sliding bearing 1 is an exemplary planetary gear bearing of a planetary stage of a gearbox G for a wind turbine. The temperature signal measured by sensor 2 is supplied to an electronic control unit ECU, which here is enclosed by a dashed line and contains at least the following functional units: sliding bearing model N-V-F, wear model VS, accumulation unit Akk and output unit AE. The functional units of the ECU can thereby be arranged in a manner that is spatially adjacent or distributed. Furthermore, the functional units can also be composed of several components. The measured oil outlet temperature $T_A$ at sliding bearing 1 is used within the ECU for an adjustment A for an assigned condition variable—here, the calculated oil outlet temperature $T_A^*$—from a model-based monitoring of the condition of the sliding bearing 1 described in the following.

For the model-based monitoring of the condition of the sliding bearing 1, the control unit ECU is equipped with a physical sliding bearing model N-V-F, which assigns a dynamic behavior of the lubricating oil in the sliding bearing 1 to input variables that are supplied and determines a monitoring characteristic condition variable of the sliding bearing 1 from these.

Within the framework of the sliding bearing model N-V-F there are used an ideal model N for the nominal case of the normal operation of the sliding bearing 1, a variable model V which can be adapted to the real operating behavior of the sliding bearing 1, along with a fault model F for mapping with regard to characteristic fault conditions of the sliding bearing 1, which, placed in relation to each other, allow the sliding bearing 1 to be analyzed with regard to the operating behavior or fault conditions.

The rotational speed n and the torque M are supplied to the sliding bearing model N-V-F of the ECU as input variables which have been determined by sensor technology by means of dynamic load monitoring DLM at the gearbox G by measuring the power flow. The physical sliding bearing model N-V-F uses the determined oil outlet temperature $T_A$ at the sliding bearing 1, the rotational speed n of the rotating component and the bearing load F resulting from the torque M to calculate by means of orbit analysis the minimum gap thickness of the sliding bearing 1, which is an indicator for the wear condition. If the gap thickness approaches zero, a contact that causes damage between the shaft and the bearing shell of the sliding bearing 1 must be expected. If the minimum gap thickness in the nominal rotational speed range of the rotating component reaches a normal value or range of values, it can be assumed that the sliding bearing 1 is virtually wear-free.

Depending on the results of the analysis, the control unit ECU can influence the operating behavior of the plant, for example after detecting local wear on the bearing running surfaces, the bearing load F can be reduced and the rotational speed n can be increased, in order to achieve a temporary smoothing of the relevant bearing running surfaces.

In a wear model VS assigned to the sliding bearing model N-V-F, the wear rate is determined as a parameter for wear-causing material removal on the shaft and/or bearing shell per unit of time, which is supplied to an accumulation unit Akk for accumulating the wear depending on the location. The results are interpreted in a subsequent output unit AE and are supplied to the operating control of the electronic control unit ECU.

Figure 2:
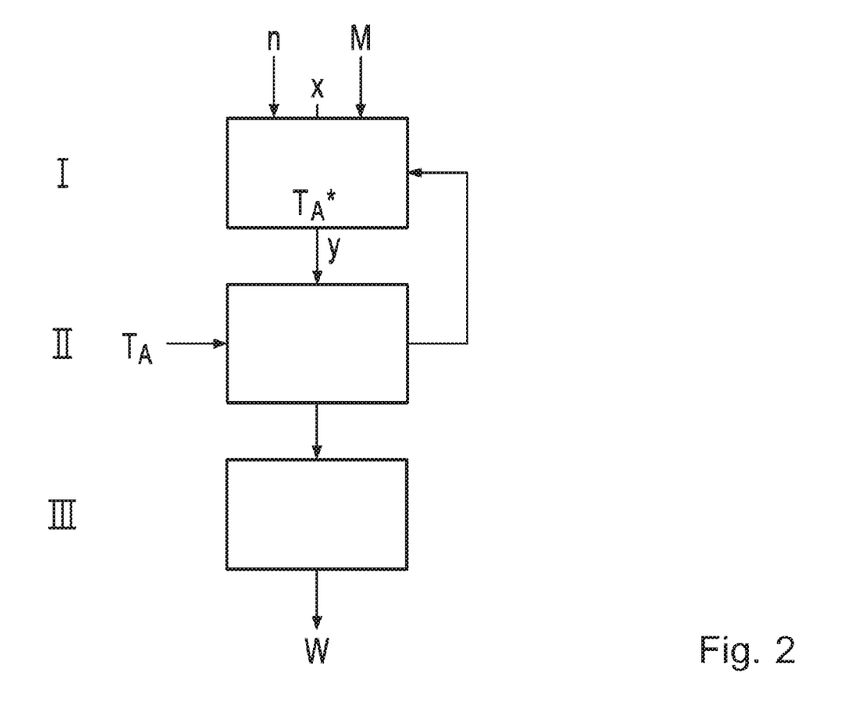

According to FIG. 2, in order to influence the operational control in a first method step I, the model-based analysis discussed above uses the rotational speed n and the torque M of the rotating component on the sliding bearing—not shown here—as input variables x to calculate a condition variable, here the oil outlet temperature $T_A^*$, on the sliding bearing as output variable y.

In a subsequent method step II, the calculated oil outlet temperature $T_A^*$ is used to compare it with an oil outlet temperature $T_A$ measured by sensor technology. The comparison is carried out, on the one hand, for the purpose of a plausibility check of the sliding bearing model used in the preceding method step I and, on the other hand, also in a subsequent method step III for the purpose of monitoring the condition of the machine or plant. This takes place by interpreting, classifying, comparing and checking the plausibility of the results from the sliding bearing model N-V-F for the purpose of condition monitoring or by combining, classifying and accumulating them with a wear model. Finally, for example, a visual or acoustic warning signal W can be issued to the operator of the machine/plant if the wear in a bearing area of the sliding bearing exceeds previously set limits.

It is also conceivable that such a warning signal W could be supplied back to the ECU or the like to initiate corrective control measures.

The invention is not limited to the preferred exemplary embodiment described above. Rather, variations are also conceivable for this; these are also covered by the scope of protection of the following claims. For example, it is also possible to use the hydrodynamic behavior (flow behavior) of the sliding bearing instead of the temperature behavior by means of a model-based monitoring of the condition of the gap thickness of the sliding bearing as the basis for condition monitoring. Combinations of different condition variables are also conceivable—for example, those that also take into account the lubricating oil pressure. It is also possible, for example, to carry out measures to control the operation of the machine or plant as a result of the monitoring of the condition of the sliding bearing, such as a load adjustment of the load on the components, an increase in the lubricant supply in the event of insufficient lubrication, an emergency shutdown of the machine or plant when a wear limit is reached, or the like. The aforementioned load adjustment can be, for example, a reduction of the load when an overload operation is detected or an increase of the load to increase the power output of the machine or plant.

Furthermore, the solution in accordance with the invention is not limited to the condition monitoring method being carried out locally in the machine or plant. This can also be carried out, for example, on a client-server architecture, in which the sensor measurement value determination takes place on the client side and the model-based condition monitoring takes place on the server side. The use of a cloud platform for this purpose is also conceivable. This offers the advantage that the determined condition monitoring information can also be made usable for purposes other than the operational control of the machine or plant. A cloud platform is understood to be a networked information technology structure in which at least one server is connected to at least one database that can also be used simultaneously by other servers via user-specific communication interfaces for the purpose of data exchange. The data exchange can take place with various users via clients that can be connected to the at least one server.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Sliding bearing
2 Sensor for oil outlet temperature $T_A$

3 Sensor for oil sump temperature $T_S$
n Rotational speed
M Torque
s Bearing gap
F Bearing load
$T_A$ Oil outlet temperature
$T_S$ Oil sump temperature
$T_A^*$ Oil outlet temperature (calculated)
N-V-F Physical sliding bearing model
N Ideal model
V Variable model
F Fault model
VS Wear model
ECU Electronic control unit
DLM Dynamic load monitoring
Akk Accumulation unit
AE Output unit
x Input variables
y Output variables
W Warning signal

The invention claimed is:

1. A method for monitoring and controlling a condition of a sliding bearing operated with lubricating oil for a rotating component, the method comprising:
   calculating, by a control unit as an output variable of a sliding bearing model, a calculated value of a minimum gap thickness of the sliding bearing, the calculated value being calculated by orbit analysis from at least one physical sliding bearing model to which at least a rotational speed of the rotating component, a bearing load, and a temperature of the sliding bearing are supplied as input variables;
   measuring, with at least one sensor, a minimum gap thickness to provide a measured value of the minimum gap thickness;
   comparing the measured value of the minimum gap thickness with the calculated value of the minimum gap thickness;
   adjusting operation of the rotating component according to the comparison of the measured value of the minimum gap thickness with the calculated value of the minimum gap thickness;
   calculating, for plausibility checking by the control unit, at least one condition variable at least comprising an oil outlet temperature at the sliding bearing as the output variable, from at least a torque and the rotational speed as input variables; and
   using the at least one condition variable to compare it with an oil outlet temperature of the sliding bearing model measured by a sensor.

2. The method according to claim 1, comprising parallel calculation of the sliding bearing model in an ideal model and a variable model, wherein the variable model is used for calibration and thereby adapted to real operating behavior of the sliding bearing.

3. The method according to claim 2, comprising additional parallel calculation of the sliding bearing model in a fault model for mapping with respect to characteristic fault conditions, wherein the characteristic fault conditions are selected from a group comprising inadequate lubrication, changed oil viscosity, and wear-related change in geometry at the sliding bearing.

4. The method according to claim 3, wherein the ideal model is related to the variable model and/or the fault model in order to determine residuals as a difference between two compared models.

5. The method according to claim 4, wherein a wear model is used, wherein output values of the wear model represent a measure of a wear condition of the sliding bearing, wherein the operating behavior of a machine or plant comprising the sliding bearing is adapted by the control unit according to the wear condition.

6. The method according to claim 5, wherein an adaptation of the operating behavior of the machine or plant by the control unit is effected,
   wherein, once a predefined limit value or threshold value characterizing the wear condition of the sliding bearing has been reached, the bearing load acting thereon is reduced and/or the rotational speed is increased in order to achieve a smoothing of bearing running surfaces, and/or
   wherein, as soon as a limit value or threshold value for a physical variable or dimensionless indicator characterizing a critical operating condition is reached, a conversion takes place to a predefined control parameter, in particular the maximum permissible temperature of the sliding bearing, whereupon the control unit adapts the operating behavior.

7. The method according to claim 1, wherein the rotational speed and/or the torque are determined as input variables by a measurement in a power flow before or after the sliding bearing by dynamic load measurement.

8. A system comprising a control unit configured to implement the method according to claim 1.

9. The system according to claim 8, wherein the sliding bearing model calculates at least one condition variable, at least comprising the bearing gap in the sliding bearing as the output variable, from at least the torque and the rotational speed as input variables, and uses it in order to compare it with a bearing gap measured by a sensor for plausibility checking of the sliding bearing model.

10. The system according to claim 8, wherein, in a course of the comparison, the wear model is supplied with characteristic variables for a tribological regime of the sliding bearing, wherein the wear model contains:
   a wear characteristic map in which a wear rate obtained from tests is stored for operating conditions of the sliding bearing, comprising sliding speed and bearing gap, and/or
   physical wear models, comprising models for the description of the surface structure and its consideration in the sliding bearing model, and/or
   probabilistic wear models, as neural networks trained by tests.

11. The system according to claim 8, wherein a wear rate determined from the wear model is accumulated, wherein an accumulation unit performs:
   continuous or discrete accumulation of the location-dependent wear of the sliding bearing, and/or
   carrying along an up-to-date model of the geometry of the sliding bearing from the determined wear.

12. The system according to claim 8, wherein an output unit is provided for interpreting the results from the sliding bearing model, the accumulation unit and/or the wear model, in order to perform, within the framework of condition monitoring, at least one of:
   warning if the wear in a bearing area of the sliding bearing exceeds previously set limits,
   derivation of recommended actions for the operational control of the machine or plant,
   diagnostic functions for the system,
   statistical information regarding the operating behavior of the machine or plant, or history of the wear progress over time with a trend analysis and a forecast of maintenance requirements.

13. A wind turbine comprising a system for monitoring the condition of a sliding bearing operated with lubricating oil according to claim 8.

14. A computer program product comprising program code including processor-executable instructions that, when executed by a processor, cause the processor to perform a condition monitoring of a sliding bearing in accordance with the method according to claim 1, wherein the computer program product is configured to run on a software-controlled electronic control unit or a cloud platform.

* * * * *